(12) United States Patent
Bi

(10) Patent No.: US 9,224,002 B2
(45) Date of Patent: Dec. 29, 2015

(54) METHOD AND APPARATUS FOR FILE ENCRYPTION/DECRYPTION

(71) Applicant: TENCENT TECHNOLOGY (SHENZHEN) COMPANY LIMITED, Shenzhen, Guangdong Province (CN)

(72) Inventor: Ting-Li Bi, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 41 days.

(21) Appl. No.: 14/140,531

(22) Filed: Dec. 25, 2013

(65) Prior Publication Data

US 2014/0108795 A1    Apr. 17, 2014

Related U.S. Application Data

(63) Continuation of application No. PCT/CN2012/076890, filed on Jun. 14, 2012.

(30) Foreign Application Priority Data

Sep. 22, 2011    (CN) .......................... 2011 1 0283896

(51) Int. Cl.
*H04L 29/06* (2006.01)
*G06F 12/14* (2006.01)
(Continued)

(52) U.S. Cl.
CPC ........ *G06F 21/6218* (2013.01); *G06F 21/6209* (2013.01); *G06F 2221/2107* (2013.01); *G11B 20/0021* (2013.01)

(58) Field of Classification Search
CPC .................... G06F 21/6218; G06F 2221/2107; G06F 21/6209; G11B 20/0021

USPC ..................................... 713/165, 189; 726/26
See application file for complete search history.

(56) References Cited

U.S. PATENT DOCUMENTS

2007/0180257 A1    8/2007  Bae et al.
2010/0161919 A1*   6/2010  Dodgson et al. .............. 711/161

FOREIGN PATENT DOCUMENTS

CN    1373424 A    10/2002
CN    1553347 A    12/2004
(Continued)

OTHER PUBLICATIONS

Quan-Xing Miao, "Research and Analysis on Encryption Principle of TrueCrypt Software System", Proceedings of 2010 2nd International Conference on Information Science and Engineering, Dec. 2010, pp. 1409-1412, http://dx.doi.org/10.1109/ICISE.2010.5691392.
(Continued)

*Primary Examiner* — Aravind Moorthy
(74) *Attorney, Agent, or Firm* — Cheng-Ju Chiang

(57) ABSTRACT

A file encrypting method and apparatus, and a file decrypting method and apparatus is provided. The method includes following steps: creating a virtual disk; the virtual disk receiving a writing request from a file system, encrypting data in the writing request; and notifying the file system to write the encrypted data into a corresponding physical disk, so that the file system writes the encrypted data into the corresponding physical disk after receiving a notification from the virtual disk. The methods and apparatuses can employ the virtual disk to encrypt data in the writing request and decrypt the data required by the reading request, and this manner achieves highly-reliable, secure and effective file encrypting.

14 Claims, 7 Drawing Sheets

(51) Int. Cl.
  *G06F 17/30* (2006.01)
  *G06F 21/62* (2013.01)
  *G11B 20/00* (2006.01)

(56) References Cited

FOREIGN PATENT DOCUMENTS

| CN | 1794210 A | 6/2006 |
|---|---|---|
| CN | 101398824 A | 4/2009 |
| CN | 101499038 A | 8/2009 |
| CN | 101847184 A | 9/2010 |
| CN | 101853363 A | 10/2010 |
| CN | 101877246 A | 11/2010 |
| CN | 102053925 A | 5/2011 |
| JP | 2010-204750 A | 9/2010 |
| TW | 201040775 A1 | 11/2010 |
| WO | 2013/040915 A1 | 3/2013 |

OTHER PUBLICATIONS

"Saving Important Files in an Encrypted Virtual Drive", ASCII dot PC, Jun. 24, 2011, pp. 107-110, August Issue Supplement.

* cited by examiner

```
┌─────────────────────────┐
│  the virtual disk redirects │
│  the reading request received│
│  from the file system to the│
│  physical disk so that the │
│  file system fetches the data│ ～501
│  required by the reading │
│  request from the physical │
│           disk          │
└─────────────────────────┘
              │
              ▼
┌─────────────────────────┐
│  the virtual disk receives │
│  the data fetched by the file│
│  system from the physical │
│  disk, decrypts the data, and│
│  then sends the decrypted │ ～502
│  data to the file system so│
│  that the file system    │
│  provides the decrypted data│
│       to a user end      │
└─────────────────────────┘
```

FIG. 5

METHOD AND APPARATUS FOR FILE ENCRYPTION/DECRYPTION

The application is a U.S. continuation application under 35 U.S.C. §111(a) claiming priority under 35 U.S.C. §§120 and 365(c) to International Application No. PCT/CN2012/076890 filed Jun. 14, 2012, which claims the priority benefit of China patent application serial No. 201110283896.5, titled "method and apparatus for file encryption/decryption" and filed on Sep. 22, 2011, the contents of which are incorporated by reference herein in their entirety for all intended purposes.

TECHNICAL FIELD

The present disclosure relates to data processing technique, and more particularly to a method and an apparatus for file encryption/decryption.

BACKGROUND

Currently, more commonly used file encrypting methods are: direct encryption, transparent file encryption, and the encryption interface provided by the operating system. These three encryption methods are all capable of achieving file encryption; however, each of them has its own shortcomings described as follows.

Direct encryption is used to directly encrypt files in the disk, and WinRar™ is a typical representative. However, the shortcoming of direct encryption is: encrypted files should be manually decrypted every time before using the files, and also the decrypted files need to be manually encrypted after using. This method heavily depends on manual operation and the whole procedure is complex and cumbersome.

Transparent file encryption uses filter driver of an operating system (i.e. Window™) to encrypt/decrypt files, which overcomes the shortcoming of direct encryption that the files should be manually encrypted/decrypted. However, transparent file encryption still has the shortcoming that the filter driver of Windows exists on the file system driver of Windows. As a result, it is necessary to take a lot of filtering operations to all the files if the filter driver is used, and these filtering operations seriously affect system performance.

According to the above description, an urgent problem need to be solved provides a reliable, safe and effective file encrypting method.

SUMMARY

In one aspect, the present disclosure provides a file encrypting method and apparatus, thereby achieving highly-reliable, safe and effective file encryption.

In another aspect, the present disclosure provides a file decrypting method and apparatus corresponding to the above file encrypting method and apparatus, thereby achieving file decryption using a virtual disk without reducing reading performance of the file.

In yet another aspect, the present disclosure is achieved by the following technical solutions.

A file encrypting method includes creating a virtual disk, the method further includes: the virtual disk receiving a writing request from a file system, encrypting data in the writing request, and notifying the file system to write the encrypted data into a corresponding physical disk, accordingly, the file system receives a notification from the virtual disk and then writes the encrypted data into the corresponding physical disk.

A file decrypting method includes a step of creating a virtual disk, the method further includes: a step A, the virtual disk redirecting a received reading request from the virtual disk to a physical disk so that the file system fetches data required by the reading request from the physical disk; and a step B, the virtual disk receiving the data fetched by the file system from the physical disk, decrypting the received data, and sending the decrypted data to the file system. The file system provides the decrypted data to a user end.

A file encrypting apparatus includes a virtual disk creating unit, and a virtual disk driving unit. The virtual disk creating unit is configured for creating a virtual disk. The virtual disk driving unit is configured for receiving a writing request from a file system, encrypting data in the writing request, and notifying file system to write the encrypted data into a corresponding physical disk. The file system receives a notification from the virtual disk and then writes the encrypted data into the corresponding physical disk.

A file decrypting apparatus includes a virtual disk creating unit, and a virtual disk driving unit. The virtual disk creating unit is configured for creating a virtual disk. The virtual disk driving unit includes a redirecting module and a decrypting module. The redirecting module is configured for redirecting a reading request received from a file system to a physical disk, so that the file system fetches data required by the reading request from the physical disk. The decrypting module is configured for receiving the data fetched by the file system from the physical disk, decrypting the received data and sending the decrypted data to the file system. The file system provides the decrypted data to a user end.

As shown in the technical solutions stated above, in the present disclosure, data in the writing request is encrypted with the virtual disk, the data required by the reading request is decrypted with the virtual disk, and this method improves reliability, safety and effectiveness of file encryption.

BRIEF DESCRIPTION OF THE DRAWINGS

To illustrate the technical solution according to embodiments of the present disclosure more clearly, drawings to be used in the description of the embodiments are described in brief as follows. Obviously, the drawings in the following description are merely some embodiments of the present disclosure. It is to be noted that for those ordinarily skilled in the art, other drawings can be fetched according to these drawings without doing any creative work.

FIG. 5 is an abstract flowchart provided by another embodiment of the present disclosure;

PREFERRED EMBODIMENTS

The technical solution in the embodiments of the present disclosure will be described clearly and completely accompanying with drawings of embodiments of the present disclosure as follows. Apparently, the described embodiments are only a part of the embodiments of the present disclosure, but not all the embodiments. Based on the embodiments of the present disclosure, all other embodiments achieved by those ordinarily skilled in the art without doing any creative work, should be included in the scope of the present disclosure.

The embodiments of the present disclosure will be further described in detail accompanying with drawings as follows.

The method and apparatus for file encryption, and the method and apparatus for file decryption provided by the present disclosure are based on virtual disk of an operating system (i.e. Window™). The socalled virtual disk is substantially similar to the known physical disk, which refers to volumes in Windows™ and corresponds to at least one device.

Figure 1:
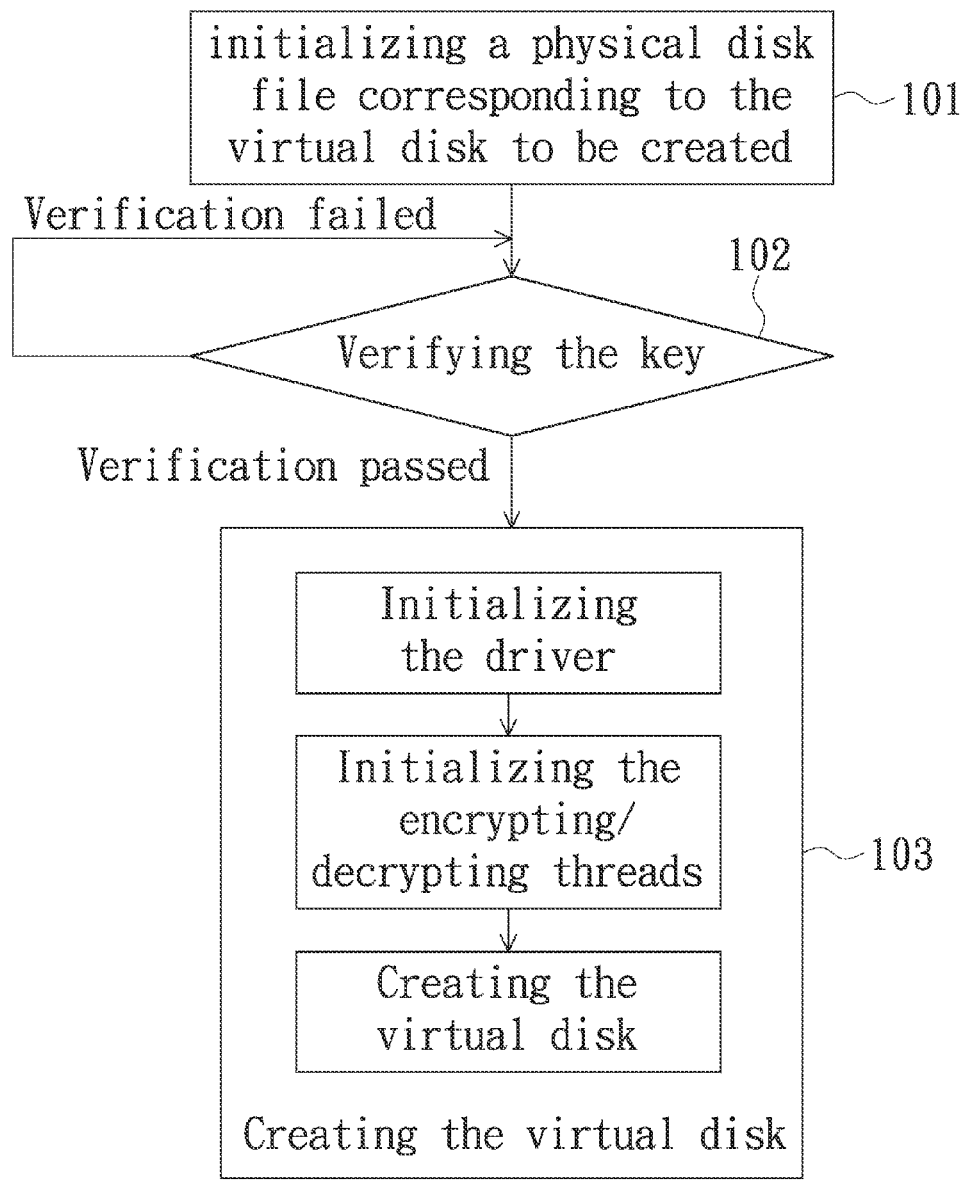
FIG. 1 is a flowchart of a method for creating virtual disk according to an embodiment of the present disclosure.

Before describing the method and apparatus for file encryption, and the method and apparatus for file decryption, how to create the virtual disk is firstly described:

Referring to FIG. 1, FIG. 1 is a flow chart of a method for creating virtual disk provided by an embodiment of the present disclosure. As shown in FIG. 1, the flow may include the following steps:

Step 101, initializing a physical disk file corresponding to the virtual disk to be created.

In step 101, the physical disk file corresponding to the virtual disk may be pre-configured manually, and the physical disk file may have a suffix of ".qbox". The physical disk file is used to store data written into the virtual disk. That is, when writing data into the virtual disk, it is necessary to redirect the data to the physical disk file. When sending a reading request to the virtual disk for reading the data, it is necessary to redirect the reading request to the physical disk file for reading the data required by the reading request.

Step 102, when creating the virtual disk, requesting the user to provide a key for using the physical disk file and verifying the key provided by the user. If the verification is passed, a step 103 should be executed. Otherwise, return to step 102 or end the current flow.

Step 103, creating the virtual disk.

In an implemention example, the step 103 may include the following steps:

Step 1, initializing the driver run in the kernel, so that the driver serves as a driver of the virtual disk in the following process. The driver processes the reading and writing requests to the virtual disk. Here, the driver may be a kind of executable file of an operating system (i.e. Window™) and has a suffix of ".sys".

Step 2, initializing kernel encrypting/decrypting threads.

Here, a thread is a basic unit of an operating system (i.e. Window™) task scheduling, the kernel encrypting thread is the thread that run in the system kernel space and used to encrypt, and the kernel decrypting thread is the thread that run in the system kernel space and used to decrypt.

It is to be noted that step 1 and step 2 are only an example of the initialization process for creating the virtual disk in an operating system (i.e. Window™). In other environments, the initialization processes for creating the virtual disk are different, and the present disclosure is not limited to the example.

Step 3, creating the virtual disk using a control for creating virtual disks.

In an example, the control used to create virtual disks in step 3 is the IoCteateDevice control of an operating system (i.e. Window™).

Additionally, the virtual disk created in step 3 has a unique identifier, such as \Device\HaarddiskVolume2, and also has a corresponding device type, for example, FILE_DEVICE_DISK, which represents a disk device.

Thus, by above steps 1 to 3, the operation of creating the virtual disk in step 103 is achieved.

Preferably, in the present disclosure, to make the virtual disk is visible in a user mode, the virtual disk can be assigned with a driver letter using a driver letter assigning control such as the "IoCreateSymbolicLink" control in an operating system (i.e. Window™). Furthermore, in order to make the assigned driver letter can be seen in the "My Computer" view of Windows, it is necessary to establish a driver letter connection for the device.

At this point, the main steps for creating the virtual disk are already executed. However, considering the plug-and-play feature of the virtual disk provided by the present disclosure, it is necessary to notify the virtual disk to a disk management module (MountManger) of an operating system (i.e. Window™); and/or notify a resource management module (explorer) using broadcasting message so that the explorer re-enumerates the virtual disk.

So, the user is able to perform the reading and writing operations to the virtual disk in a similar way to the physical disk, but the virtual disk would redirect the reading/writing requests to the corresponding physical disk file when performing the reading/writing operations. The detail process is described in the following embodiments.

This embodiment describes a file encrypting method based on the above virtual disk.

Figure 2:
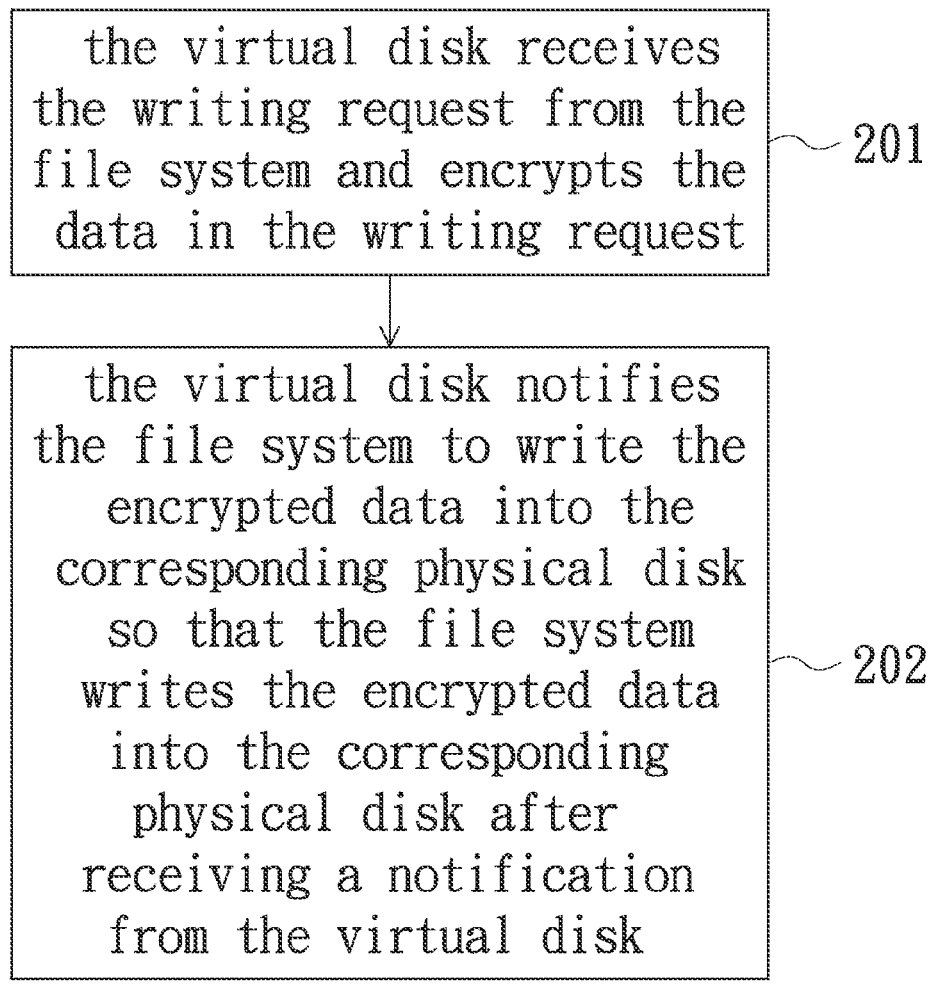
FIG. 2 is an abstract flowchart provided by an embodiment of the present disclosure.

Referring to FIG. 2, FIG. 2 is an abstract flowchart of embodiment 1. As shown in FIG. 2, the flow may include the following steps:

Step 201, the virtual disk receives the writing request from the file system and encrypts the data in the writing request.

Step 202, the virtual disk notifies the file system to write the encrypted data into the corresponding physical disk so that the file system writes the encrypted data into the corresponding physical disk after receiving a notification from the virtual disk.

To illustrate the flow shown in FIG. 2 more clearly, the flow is further explained in detail with reference to FIG. 3.

Figure 3:
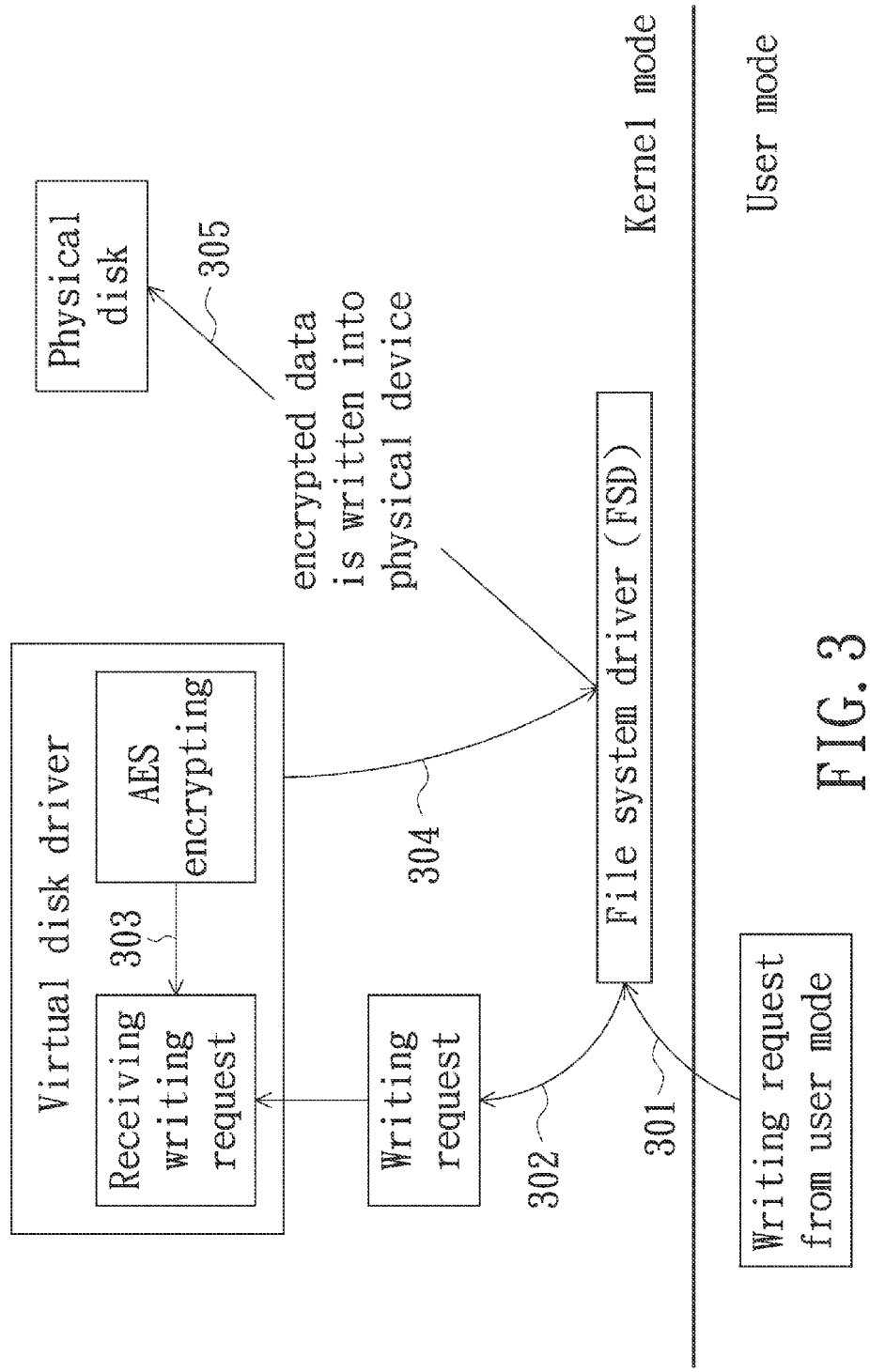
FIG. 3 is a detailed flowchart provided by this embodiment shown in FIG. 2.

Referring to FIG. 3, FIG. 3 is a detailed flowchart illustrating the flow of embodiment 1. As shown in FIG. 3, the flow may include the following steps:

Step 301, a user launches a writing request, using a control for launching writing requests such as WriteFile, in a user mode.

The writing request includes an identifier of the virtual disk and the data to be written into the virtual disk.

The user mode indicates that the writing request launched in step 301 is executed in a user space.

Step 302, the file system, in a kernel mode, receives the writing request from the user mode, if the writing request includes the identifier of the virtual disk; the file system sends the writing request to the virtual disk.

Specifically, the file system in embodiment 1 may be a file system driver (FSD) or other modules having similar functions.

The kernel mode indicates that, in step 302, the writing request is received by the file system in a kernel space.

Step 303, the virtual disk receives the writing request from the file system and encrypts the data in the writing request.

Step 303 is performed by the driver of the virtual disk.

Additionally, under Windows system, reading/writing operations of disks are performed in the unit of clusters. The size of a cluster is greater than 512 bytes and less than 64 k bytes, and values the $N^{th}$ power of 2. The default cluster size of the NTFS file system of Windows is 4096 bytes, and the default cluster size of the FAT32 file system is 512 bytes. Due to this feature of disks, it is easily to encrypt data using the mainstream encrypting algorithms.

Currently, the mainstream encrypting algorithms include the stream encrypting algorithm and the block encrypting algorithm. Compared with the stream encrypting algorithm, the block encrypting algorithm has minimum encryption length and alignment requirements. The minimum encryption length is generally $N^{th}$ power of 2, i.e. 8, 16 or 32 bytes. In this way, the boundaries of the minimum reading/writing unit of disks are aligned exactly and it is not necessary to fill invalid data to use block encryption. Generally, transparent file encryption needs to fill invalid data for using block encryption algorithm. Preferably, considering the data security, block encryption algorithm that has high level security, such as AES encryption algorithm, is used to encrypt data in the present embodiment.

Step 304, the virtual disk ascertains the physical disk file corresponding to the virtual disk itself, then the virtual disk replaces the identifier of the virtual disk in the writing request with the identifier of the physical disk file, then the virtual disk sends the writing request to the file system.

The ascertained physical disk file in step 304 is the initialized file in step 101.

Additionally, step 304, for example, is executed by the driver of the virtual disk. The step of sending the writing request to the file system is executed by the driver of the virtual disk using a control for sending writing requests such as ZWWriteFile.

Step 305, the file system receives the writing request from the virtual disk, and then the file system writes the encrypted data in the writing request into the physical disk file, which is specified by the file identifier in the writing request.

Then, the flow shown in FIG. 3 is completed.

As the virtual disk is visible only in the kernel mode, this embodiment utilizes the virtual disk in the kernel mode to encrypt data and the virtual disk is invisible for the user in the user mode. Thus, even if the user logs into the Windows, the data in the virtual disk can't be read and a reliable data encrypting method is achieved.

Additionally, in this embodiment, the method only uses the virtual disk to encrypt data and the virtual disk does not affect the general reading/writing performance. Thus, the method barely affects performance of the operating system.

Here, the method provided in this embodiment is described as above. Corresponding to the method provided in this embodiment, a file encrypting apparatus is further provided.

Figure 4:
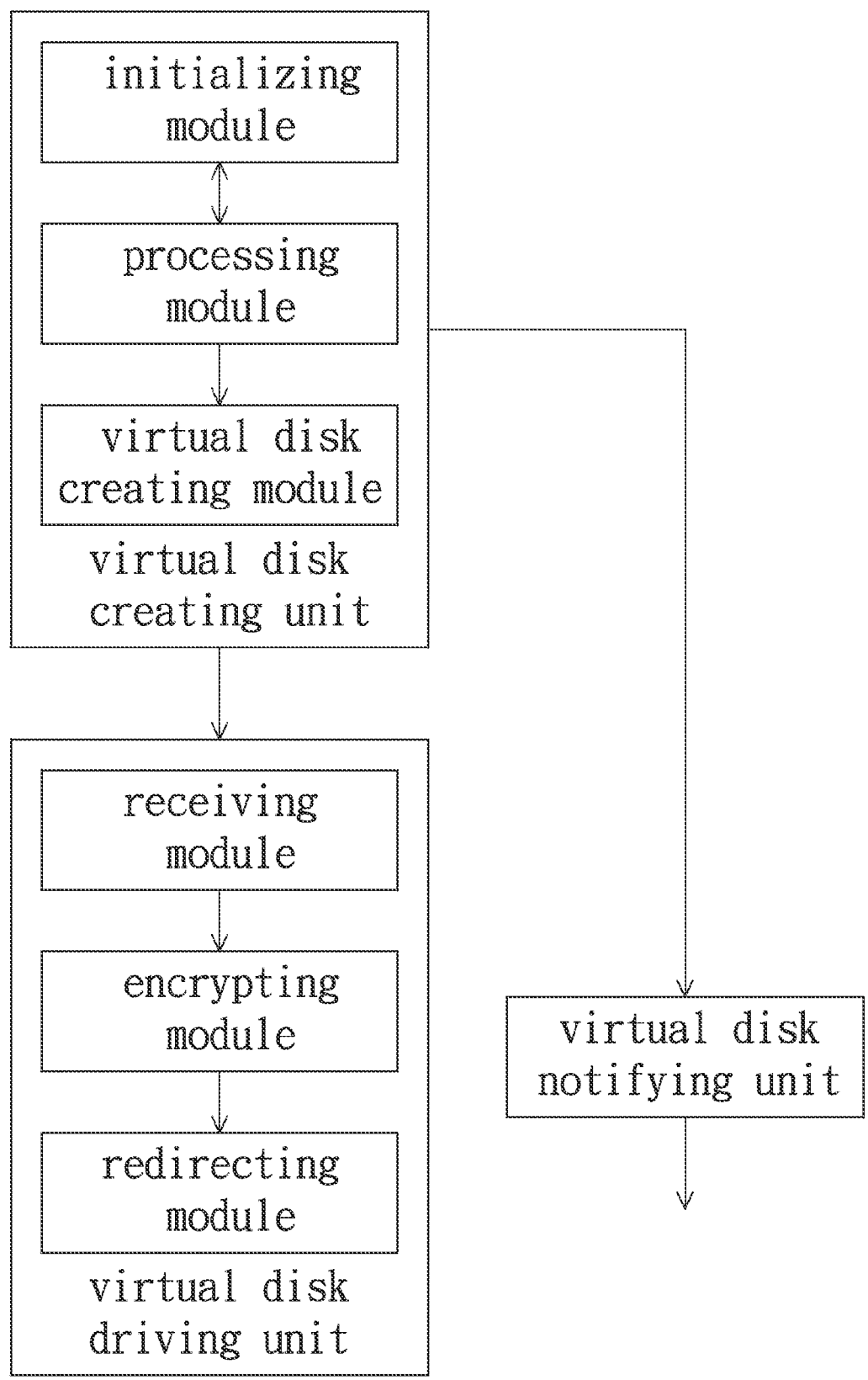
FIG. 4 is a block diagram of an apparatus provided by embodiment 1 of the present disclosure.

Referring to FIG. 4, FIG. 4 is a block diagram of a file encrypting apparatus provided in this embodiment. As shown in FIG. 4, the apparatus includes a virtual disk creating unit and a virtual disk driving unit.

The virtual disk creating unit is configured for creating a virtual disk.

The virtual disk driving unit is configured for receiving a writing request from a file system, encrypting data in the writing request, and notifying the file system to write the encrypted data into a corresponding physical disk so that the file system writes the encrypted data into the corresponding physical disk after receiving the notification from the virtual disk.

The virtual disk is visible in the kernel mode and has a unique identifier. Preferably, as shown in FIG. 4, the apparatus further includes a virtual disk notifying unit.

The virtual disk notifying unit is configured for notifying the virtual disk to a disk management module of an operating system (i.e. Window™), after the virtual disk creating unit creating the virtual disk and before the virtual disk driving unit receiving the writing request; and/or notifying a resource management module of Windows using broadcasting message such that the resource management module re-enumerates the virtual disk.

In this embodiment, the virtual disk driving unit includes a receiving module, an encrypting module and a redirecting module.

The receiving module is configured for receiving the writing request from the file system.

The encrypting module is configured for encrypting the data in the writing request.

The redirecting module is configured for ascertaining the physical disk file corresponding to the virtual disk, replacing the identifier of the virtual disk in the writing request with the identifier of the physical disk file, and then sending the writing request to the file system. As a result, the file system writes the encrypted data in the writing request into the physical disk file corresponding to the identifier in the writing request, after receiving the writing request from the virtual disk.

In this embodiment, the virtual disk creating unit includes an initializing module, a processing module and a virtual disk creating module.

The initializing module is configured for initializing the physical disk file corresponding to the virtual disk.

The processing module is configured for requesting the user to provide a key for using the physical disk file and verifying the key provided by the user when the virtual disk creating module is triggered to create the virtual disk. If the verification is passed, the initializing module triggers the initializing module to proceed with the initialization that is required to create the virtual disk, and triggers the virtual disk creating module to create the virtual disk after detecting that the initializing module finished the initialization process.

The virtual disk creating module is configured for creating the virtual disk when triggered by the processing module.

The apparatus provided in this embodiment is described as above.

Another embodiment describes a file decrypting method based on the virtual disk described above.

Referring to FIG. 5, FIG. 5 is an abstract flowchart of another embodiment according to this disclosure. As shown in FIG. 5, the flow includes the following steps.

Step 501, the virtual disk redirects the reading request received from the file system to the physical disk so that the file system fetches the data required by the reading request from the physical disk.

Step 502, the virtual disk receives the data fetched by the file system from the physical disk, decrypts the data, and then sends the decrypted data to the file system. The file system provides the decrypted data to a user end.

Figure 6:
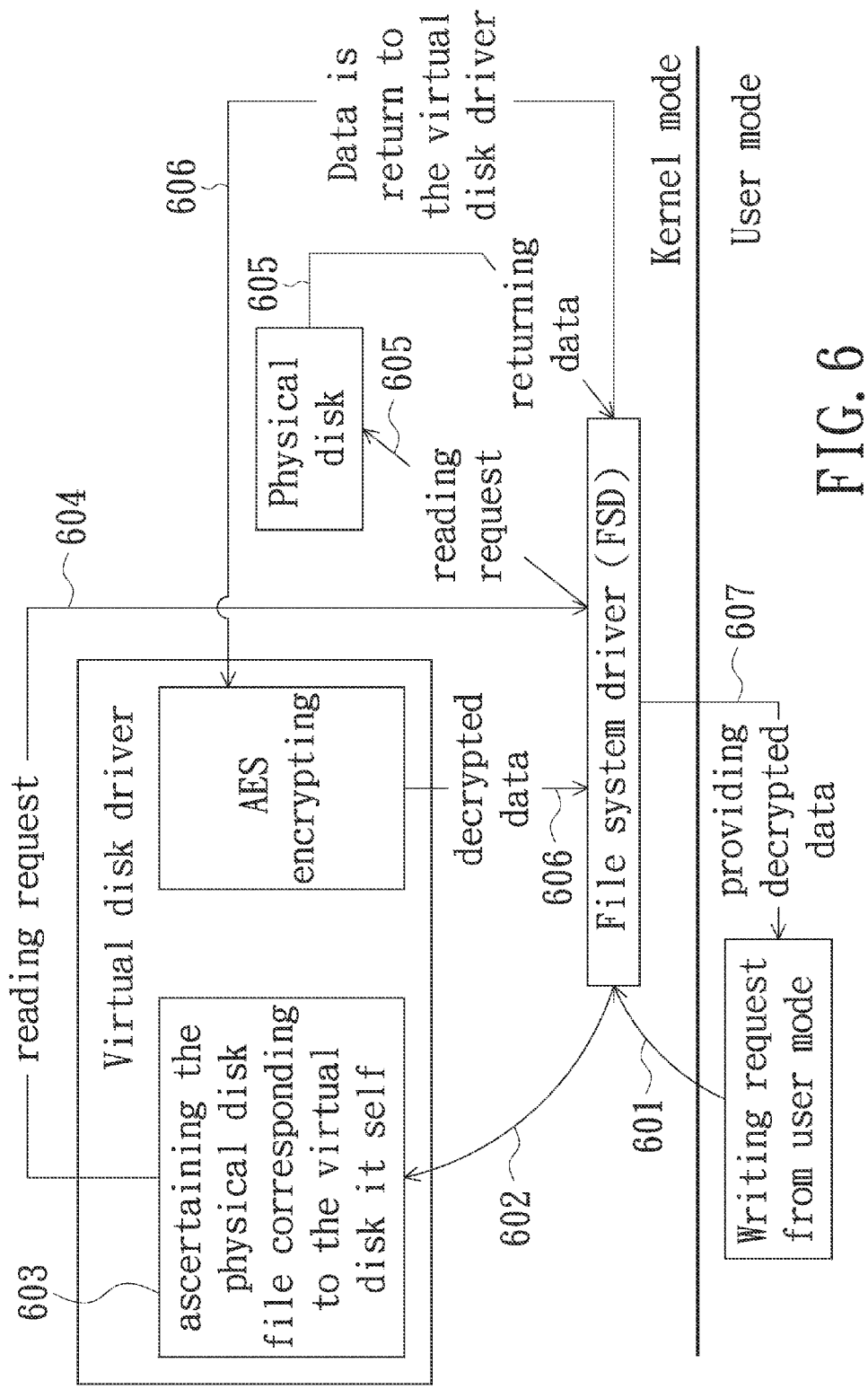
FIG. 6 is a detailed flowchart provided by this embodiment shown in FIG. 5.

To illustrate the flow shown in FIG. 5 more clearing, the flow shown in FIG. 5 is described in detail with the reference to FIG. 6.

Referring to FIG. 6, FIG. 6 is a detailed flowchart of the present embodiment according to this disclosure. As shown in FIG. 6, the flow includes the following steps.

Step 601, a user launches a reading request, using a control for launching reading requests such as ReadFile, in a user mode.

The reading request includes an identifier of the virtual disk.

Step 602, the file system, in a kernel mode, receives the reading request from the user mode, if the reading request includes the identifier of the virtual disk; the file system sends the reading request to the virtual disk.

Specifically, the file system in the present embodiment may be a FSD or other modules having similar functions.

Step 603, the virtual disk ascertains the physical disk file corresponding to the virtual disk itself after receiving the reading request from the file system.

The ascertained physical disk file in step 603 is the initialized file as described in step 101.

Additionally, step 603 is executed by the driver of the virtual disk.

Step 604, the virtual disk replaces the identifier of the virtual disk in the reading request with the identifier of the physical disk file in the reading request, and then sends the reading request to the file system.

The reading request in step 604 may be send by the driver of the virtual disk using a control for sending reading requests such as ZWReadFile.

Step 605, the file system sends the reading request to the physical disk file corresponding to the identifier in the reading request, after receiving the reading request form the virtual disk. The reading request is send for fetching data required by the reading request from the physical disk file.

According to the description of embodiment 1, in step 605, the data fetched by the file system is encrypted data.

Step 606 the virtual disk receives the data fetched by the file system from the physical disk, decrypts the data, and then sends the decrypted data to the file system.

The decrypting algorithm used in step 606 is matched to the encrypting algorithm in this embodiment. For example, the decrypting algorithm may also be an AES decrypting algorithm that has a high level of security.

Step 607, the file system provides the decrypted data to a user end.

The flow shown in FIG. 6 is described as above.

It is to be noted, for those ordinarily skilled in the art, the whole or part of the steps in the above methods can be achieved by instructing hardware to perform with computer programs. The computer programs can be stored in a computer readable medium. When the programs are executed, the flow of the method is above embodiments are performed. The storage medium may be a hard disk, a compact disk, a read-only memory (ROM) or a random access memory (RAM), etc.

A file decrypting apparatus provided in the present embodiment is described as follows.

Figure 7:
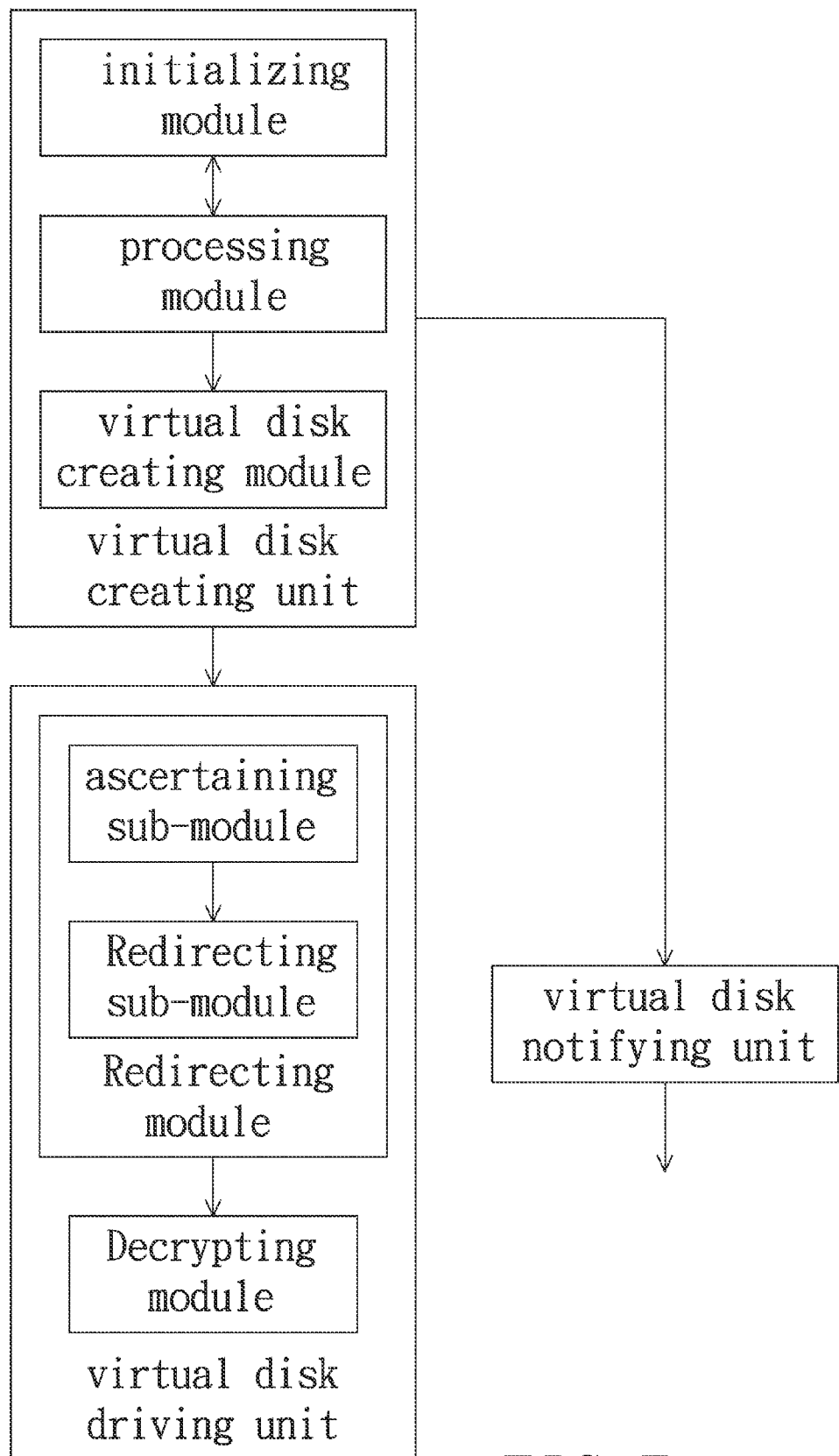
FIG. 7 is a block diagram of an apparatus provided by yet another present embodiment of the present disclosure.

Referring to FIG. 7, FIG. 7 is a block diagram of the present embodiment of this disclosure. As shown in FIG. 7, the apparatus includes a virtual disk creating unit and a virtual disk driving unit.

The virtual disk creating unit is configured for creating the virtual disk.

The virtual disk driving unit includes a redirecting module and a decrypting module.

The redirecting module is configured for redirecting a reading request sent from a file system to a physical disk, so that the file system fetches data required by the reading request from the physical disk.

The decrypting module is configured for receiving the data fetched by the file system from the physical disk, decrypting the received data and sending the decrypted data to the file system. As such, the file system may provide the decrypted data to a user end.

The virtual disk is visible in the kernel mode and has a unique identifier. As shown in FIG. 7, the apparatus further includes a virtual disk notifying unit.

The virtual disk notifying unit is configured for notifying the virtual disk to a disk management module of Windows, after the virtual disk creating unit creating the virtual disk and before the virtual disk driving unit receiving the reading request; and/or notifying a resource management module of an operating system (i.e. Window™) using broadcasting message such that the resource management module re-enumerates the virtual disk.

Preferably, as shown in FIG. 7, the redirecting module further includes an ascertaining sub-module and a redirecting sub-module.

The detecting sub-module is configured for ascertaining the physical disk file corresponding to the detecting sub-module itself after receiving the reading request.

The redirecting sub-module is configured for replacing the identifier of the virtual disk in the reading request with the identifier of the ascertained physical disk file, and then sending the reading request to the file system. The file system receives the reading request from the virtual disk, and then sends the reading request to the physical disk file corresponding to the identifier in the reading request for fetching data required by the reading request.

In this embodiment, the virtual disk creating unit includes an initializing module, a processing module and a virtual disk creating module.

The initializing module is configured for initializing the physical disk file corresponding to the virtual disk.

The processing module is configured for requesting the user to provide a key for using the physical disk file and verifying the key provided by the user when the virtual disk is triggered to create the virtual disk. If the verification is passed, the initializing module triggers the initializing module to proceed with the initialization that is required to create the virtual disk, and triggers the virtual disk creating module to create the virtual disk after detecting that the initializing module finished the initialization process.

The virtual disk creating module is configured for creating the virtual disk when triggered by the processing module.

The apparatus in the present embodiment is described as above.

As shown in the technical solutions described above, in this disclosure, the virtual disk is used to encrypt the data in the writing request and to decrypt the data in the reading request. That improves reliability, security and effectiveness of file encryption.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

INDUSTRIAL PRACTICALITY

The file encrypting/decrypting methods and apparatus of this disclosure use the virtual disk to encrypt the data in the writing request and decrypt the data in the reading request. That improves reliability, security and effectiveness of file encryption.

What is claimed is:

1. A file encrypting method, comprising a step of creating a virtual disk, the virtual disk being visible in a kernel mode and having an identifier, the method further comprising:

receiving, in the virtual disk, a writing request from a file system;

encrypting data in the writing request by a driver of the virtual disk; and notifying the file system to write the encrypted data into a corresponding physical disk thereby controlling the file system to write the encrypted data into the corresponding physical disk after the file system receiving a notification from the virtual disk;

wherein after creating the virtual disk and before the virtual disk receiving the writing request from the file system, the method further comprises:

notifying the virtual disk to a disk management module of an operating system; and/or notifying the virtual disk to a resource management module of the operating system using a broadcasting message to re-enumerate the virtual disk in the resource management module.

2. The file encrypting method according to claim 1, prior to the step of receiving a writing request from a file system, further comprising:

receiving, in the file system run in the kernel mode, the writing request from a user mode; and sending the writing request to the virtual disk if the writing request includes the identifier of the virtual disk.

3. The file encrypting method according to claim 1, wherein the step of notifying the file system to write the encrypted data into a corresponding physical disk comprises:

ascertaining a physical disk file corresponding to the virtual disk itself;

replacing the identifier of the virtual disk in the writing request with the identifier of the physical disk file; and sending the writing request to the file system;

wherein the step of writing the encrypted data into the corresponding physical disk by the file system after receiving a notification from the virtual disk comprises:

writing the encrypted data in the writing request into a physical disk file corresponding to the identifier in the writing request after receiving the writing request from the virtual disk.

4. The file encrypting method according to claim 1, wherein the step of creating the virtual disk comprises:

initializing a physical disk file corresponding to the virtual disk;

requesting a user to provide a key for using the physical disk file;

verifying the key provided by the user;

executing the initializing process required for creating the virtual disk if verification has passed; and creating the virtual disk using a control for creating virtual disk after finishing the initialization process.

5. A file decrypting method, comprising a step of creating a virtual disk, the virtual disk being visible in a kernel mode and having an identifier, the method further comprising:

redirecting a reading request, which is received from a file system, to a physical disk for fetching data required by the reading request from the physical disk;

receiving the data fetched by the file system from the physical disk;

decrypting the received data; and sending the decrypted data to the file system for providing the decrypted data to a user end;

wherein after the step of creating the virtual disk and before the step of redirecting a reading request to a physical disk, the method further comprising:

notifying the virtual disk to a disk management module of an operating system; and/or notifying the virtual disk to a resource management module of the operating system using a broadcasting message to re-enumerate the virtual disk in the resource management module.

6. The file decrypting method according to claim 5, prior to the step of receiving a reading request from a file system, further comprising:

receiving, in the file system run in the kernel mode, the reading request from a user mode; and sending the reading request to the virtual disk if the reading request includes the identifier of the virtual disk.

7. The file decrypting method according to claim 5, wherein the step of redirecting a reading request to a physical disk comprises:

ascertaining a physical disk file corresponding to the virtual disk itself;

replacing the identifier of the virtual disk in the reading request with the identifier of the physical disk file; and sending the reading request to the file system;

the method further comprising: sending, in the file system, the reading request to the physical disk file corresponding to the identifier in the reading request for fetching data required by the reading request from the physical disk file.

8. The file decrypting method according to claim 5, wherein the step of creating the virtual disk comprises:

initializing a physical disk file corresponding to the virtual disk;

requesting a user to provide a key for using the physical disk file;

verifying the key provided by the user;

executing the initializing process required for creating the virtual disk if verification has passed; and creating the virtual disk using a control for creating virtual disk after finishing the initialization process.

9. A file encrypting apparatus, comprising:

one or more first processors;

a first memory; and one or more first program units stored in the first memory and to be executed by the one or more first processors, wherein the one or more first program units comprise:

a virtual disk creating unit configured for creating a virtual disk, wherein the virtual disk is visible in a kernel mode and has an identifier;

a virtual disk driving unit configured for:

receiving a writing request from a file system;

encrypting data in the writing request; and notifying the file system to write the encrypted data into a corresponding physical disk thereby controlling the file system to write the encrypted data into the corresponding physical disk after receiving a notification from the virtual disk; and a virtual disk notifying unit configured for notifying the virtual disk to a disk management module of an operating system, and/or notifying the virtual disk to a resource management module of the operating system using a broadcasting message to re-enumerate the virtual disk in the resource management module, after creating the virtual disk and before the virtual disk receiving the writing request from the file system.

10. The file encrypting apparatus according to claim 9, wherein the virtual disk driving unit comprising:

one or more second processors;

a second memory; and one or more second program units stored in the second memory and to be executed by the one or more second processors, wherein the one or more second program units comprise:

a receiving module, configured for receiving the writing request from the file system;

an encrypting module, configured for encrypting the data in the writing request; and a redirecting module, configured for: ascertaining a physical disk file corresponding to the virtual disk itself; replacing the identifier of the virtual disk in the writing request with the identifier the physical disk file; and sending the writing request to the file system;

wherein the file system writes the encrypted data in the writing request into the physical disk file corresponding to the identifier in the writing request after receiving the writing request from the virtual disk.

11. The file encrypting apparatus according to claim 9, wherein the virtual disk creating unit comprises:

one or more third processors;

a third memory; and one or more third program units stored in the third memory and to be executed by the one or more third processors, wherein the one or more third program units comprise: an initializing module, a processing module and a virtual disk creating module, wherein:

the initializing module is configured for initializing a physical disk file corresponding to the virtual disk;

the processing module is configured for:

requesting the user to provide a key for using the physical disk;

verifying the key provided by the user;

triggering the initializing module to proceed with the initialization process that is required to create the virtual disk if the verification having passed; and triggering the virtual disk creating module to create the virtual disk after the initializing module finishing the initialization process;

the virtual disk creating module is configured for creating the virtual disk when triggered by the processing module.

12. A file decrypting apparatus, comprising:

one or more first processors;

a first memory; and one or more first program units stored in the first memory and to be executed by the one or more first processors, wherein the one or more first program units comprise:

a virtual disk creating unit, configured for creating a virtual disk, wherein the virtual disk is visible in a kernel mode and has an identifier;

a virtual disk driving unit, comprising:

one or more second processors;

a second memory; and one or more second program units stored in the second memory and to be executed by the one or more second processors, wherein the one or more second program units comprise: a redirecting module and a decrypting module; wherein the redirecting module is configured for redirecting a reading request received from a file system to a physical disk for fetching data required by the reading request from the physical disk; and the decrypting module is configured for receiving the data fetched by the file system from the physical disk, decrypting the received data and sending the decrypted data to the file system for providing the decrypted data to a user end; and a virtual disk notifying unit configured for notifying the virtual disk to a disk management module of an operating system, and/or notifying the virtual disk to a resource management module of the operating system using a broadcasting message the resource management module to re-enumerate the virtual disk in the resource management module, after creating the virtual disk and before the virtual disk receiving the writing request from the file system.

13. The file decrypting apparatus according to claim 12, wherein the redirecting module comprises:

one or more third processors;

a third memory; and one or more third program units stored in the third memory and to be executed by the one or more third processors, wherein the one or more third program units comprise:

an ascertaining sub-module configured for ascertaining the physical disk file corresponding to the detecting sub-module itself after receiving the reading request;

a redirecting sub-module configured for replacing the identifier of the virtual disk in the reading request with the identifier of the ascertained physical disk file, and then sending the writing request to the file system;

where the file system sends the reading request to the physical disk file corresponding to the identifier in the reading request for fetching data required by the reading request after receiving the reading request from the virtual disk.

14. The file decrypting apparatus according to claim 12, wherein the virtual disk creating unit comprises:

one or more fourth processors;

a fourth memory; and one or more fourth program units stored in the fourth memory and to be executed by the one or more fourth processors, wherein the one or more fourth program units comprise: an initializing module, a processing module and a virtual disk creating module, wherein:

the initializing module is configured for initializing a physical disk file corresponding to the virtual disk;

the processing module is configured for requesting the user to provide a key for using the physical disk, verifying the key provided by the user, triggering the initializing module to proceed with the initialization process that is required to create the virtual disk if the verification having passed, and triggering the virtual disk creating module to create the virtual disk after the initializing module finishing the initialization process; and the virtual disk creating module is configured for creating the virtual disk when triggered by the processing module.

* * * * *